US010149277B2

(12) United States Patent
Qu

(10) Patent No.: US 10,149,277 B2
(45) Date of Patent: Dec. 4, 2018

(54) METHOD AND APPARATUS FOR PAGING UE SMARTLY IN MME POOL

(71) Applicant: Telefonaktiebolaget LM Ericsson (publ), Stockholm (SE)

(72) Inventor: Zhiwei Qu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/030,557

(22) PCT Filed: Nov. 12, 2013

(86) PCT No.: PCT/CN2013/086927
§ 371 (c)(1),
(2) Date: Apr. 19, 2016

(87) PCT Pub. No.: WO2015/070368
PCT Pub. Date: May 21, 2015

(65) Prior Publication Data
US 2016/0249322 A1    Aug. 25, 2016

(51) Int. Cl.
*H04W 68/00* (2009.01)
*H04W 68/02* (2009.01)
(Continued)

(52) U.S. Cl.
CPC ........... *H04W 68/02* (2013.01); *H04W 4/025* (2013.01); *H04W 68/08* (2013.01); *H04W 68/04* (2013.01)

(58) Field of Classification Search
CPC ..... H04W 68/02; H04W 68/04; H04W 68/08; H04W 4/025
(Continued)

(56) References Cited

U.S. PATENT DOCUMENTS 9,480,045 B2 * 10/2016 Bejerano ............... H04W 68/02
2010/0220680 A1 * 9/2010 Ramankutty ......... H04W 68/08
370/329
(Continued)

FOREIGN PATENT DOCUMENTS

CN      101742645 A      6/2010
CN      101888697 A      11/2010
(Continued)

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.
(Continued)

*Primary Examiner* — Khai M Nguyen
(74) *Attorney, Agent, or Firm* — Withrow & Terranova, PLLC

(57) ABSTRACT

This disclosure provides a method for paging User equipment (UE) smartly in MME pool, comprising: transmitting a paging request to a first eNodeB the UE last accessed; if the UE is not paged, transmitting the paging request to all eNodeBs belonging to a first Tracking Area (TA) to which the first eNodeB belongs; and if the UE is not paged, determining, in a Tracking Area list assigned to the UE, a first group of Tracking Areas (TAs) adjacent to the first Tracking Area, and transmitting the paging request to all eNodeBs belonging to the first group of Tracking Areas. This disclosure also provides an apparatus for paging User equipment (UE) smartly in MME pool. This may largely decrease the paging load and save the radio resources without perceivable paging quality degradation.

20 Claims, 5 Drawing Sheets

(51) Int. Cl.
 *H04W 68/08* (2009.01)
 *H04W 4/02* (2018.01)
 *H04W 68/04* (2009.01)

(58) Field of Classification Search
 USPC ............. 455/458, 456.5, 456.6, 456.1, 456.2
 See application file for complete search history.

(56) References Cited

U.S. PATENT DOCUMENTS

| | | | | |
|---|---|---|---|---|
| 2011/0261715 | A1* | 10/2011 | Norefors | H04W 60/00 370/252 |
| 2012/0021761 | A1* | 1/2012 | Kulakov | H04W 68/08 455/456.1 |
| 2012/0295643 | A1* | 11/2012 | Arvidsson | H04W 68/04 455/458 |
| 2013/0203415 | A1* | 8/2013 | Arvidsson | H04W 8/16 455/435.1 |
| 2014/0106790 | A1* | 4/2014 | Kakinada | H04W 68/02 455/458 |
| 2016/0128020 | A1* | 5/2016 | Agarwal | H04W 68/04 370/328 |

FOREIGN PATENT DOCUMENTS

| | | |
|---|---|---|
| CN | 102316580 A | 1/2012 |
| CN | 102413568 A | 4/2012 |
| CN | 102655658 A | 9/2012 |

OTHER PUBLICATIONS

Author Unknown, "Technical Specification Group Radio Access Network; Evolved Universal Terrestrial Radio Access Network (E-UTRAN); S1 Application Protocol (S1AP) (Release 12)," Technical Specification 36.413, Version 12.0.0, 3GPP Organizational Partners, Dec. 2012, 278 pages.

International Search Report and Written Opinion for International Patent Application No. PCT/CN2013/086927, dated Aug. 15, 2014, 12 pages.

Extended European Search Report for European Patent Application No. 13897395.3, dated May 29, 2017, 7 pages.

* cited by examiner

METHOD AND APPARATUS FOR PAGING UE SMARTLY IN MME POOL

This application is a 35 U.S.C. §371 national phase filing of International Application No. PCT/CN2013/086927, filed Nov. 12, 2013, the disclosure of which is incorporated herein by reference in its entirety.

TECHNICAL FIELD

The invention generally relates to communication technologies, in particular to a method and an apparatus for paging User Equipment (UE) smartly in MME pool.

BACKGROUND

Long Term Evolution (LTE) represents a significant change to the 3G UMTS/HSPA radio access and core networks. LTE uses a flat, IP-based network architecture. A common, packet-based infrastructure is used for all services (voice and data), removing the need for the dedicated circuit-switched and packet-switched domains which are present in 3G UMTS/HSPA network.

The radio access network is simplified in LTE with the base station, or evolved NodeB (eNodeB), implementing the functions which were previously distributed between the 3G RNC and NodeB.

The network may initiate a paging procedure when sending data (e.g., services or signaling) to UE. In this case, for example, the Mobile Management Entity (MME) may send a paging message (i.e., the paging request) to the eNodeB, and then the eNodeB searches for the related UE within its coverage area. This may occupy the radio resources of the eNodeB. The more paging messages the MME sends, the more resources are consumed.

Radio resources are limited and precious to save. In order to save the resources, conventionally, the paging area for UE will be expanded gradually as follows in the Packet Switch (PS) paging:

Last accessed eNodeB by UE. This is the minimum area to page the UE, a single eNodeB.

Last accessed Tracking Area (TA) by UE. All eNodeBs belonging to the same TA the UE last accessed would receive the paging request for the UE.

All TAs in the TA list assigned to the UE. All eNodeBs belonging to the TAs in the TA list would receive the paging request for the UE. The TAs include the ones which are adjacent to the last accessed TA, and the nonadjacent ones which are assigned to that UE in Attach/TAU (Tracking Area Update) Accept messages. Conventionally, in the LTE system, paging and location update are both based on the TA list.

On one hand, in above expansion logic, the paging area is still big. For example, the paging request is sent to many eNodeBs within one TA, but only one eNodeB therein will answer it, then the hit rate is low when the area is expanded. However, if the area is narrowed, this may result in no answer from the eNodeB because the UE may move to another area, not in the area being paged. Here is the typical live configuration in the customer network, e.g., 30 eNodeBs would usually be configured per TA in average and even up to 50 eNodeBs for a TA from the customer site. In this case, the paging efficiency is low once the UE is paged in the last accessed TA, i.e. the hit rate will be 1/30~1/50, even worse if expanding the paging area to the TAs in the TA list allocated to the UE.

On the other hand, in above expansion logic, the TAs in the TA list allocated to the UE may not be geographical neighbors. This result in the paging request sent to some areas can not be responded. Therefore, it is necessary to provide a more efficient paging method to save the radio resources.

SUMMARY

To this end, this disclosure directs at paging the UE smartly by filtering out what area the UE mostly moves into. The network will page the UE in the neighbored eNodeBs/TAs if the UE can not be paged first in the eNodeB/TA accessed last time. The method and apparatus provided herein thus preferably mitigate, alleviate or eliminate one or more of the above mentioned disadvantages singly or in any combination.

In a first aspect of the invention, there is provided a method for paging User equipment (UE) smartly in MME pool, comprising: transmitting a paging request to a first eNodeB which the UE last accessed; if the UE is not paged, transmitting the paging request to all eNodeBs belonging to a first Tracking Area (TA) to which the first eNodeB belongs; and if the UE is not paged, determining, in a Tracking Area list assigned to the UE, a first group of Tracking Areas (TAs) adjacent to the first Tracking Area, and transmitting the paging request to all eNodeBs belonging to the first group of Tracking Areas.

This may help to largely decrease the paging load for the Radio Access Network (RAN), increase the paging efficiency and save the radio resources.

In an embodiment, if the UE is not paged, a second group of Tracking Areas (TAs) may be determined in the Tracking Area list, which are adjacent to the first group of Tracking Areas (TAs) except the one(s) which have been paged, and then the paging request may be transmitted to all eNodeBs belonging to the second group of Tracking Areas.

In another embodiment, if the UE is not paged, a next group of Tracking Areas (TAs) may be determined in the Tracking Area list, which are adjacent to the group of Tracking Areas (TAs) last paged except the ones which have been paged, and then the paging request may be transmitted to all eNodeBs belonging to the next group of Tracking Areas.

In a second aspect of the invention, there is also provided a method for paging User equipment (UE) smartly in MME pool, comprising: transmitting a paging request to a first eNodeB which the UE last accessed; and if the UE is not paged, determining, in an eNodeB list belonging to a Tracking Area (TA) list assigned to the UE, a first group of eNodeBs which are adjacent to the first eNodeB, and transmitting the paging request to the first group of eNodeBs.

In an embodiment, if the UE is not paged, a second group of eNodeBs may be determined in the eNodeB list, which are adjacent to the first group of eNodeBs except the ones which have received the paging request, and then the paging request may be transmitted to the second group of eNodeBs.

In another embodiment, if the UE is not paged, a next group of eNodeBs may be determined in the eNodeB list, which are adjacent to the group of eNodeBs last received the paging request, except the ones which have received the paging request, and then the paging request may be transmitted to the next group of eNodeBs.

In a third aspect of the invention, there is further provided an apparatus for paging User equipment (UE) smartly in MME pool, comprising: a first module configured to transmit a paging request to a first eNodeB which the UE last accessed; a second module configured to transmit the paging request to all eNodeBs belonging to a first Tracking Area (TA) to which the first eNodeB belongs, if the UE is not paged; and a third module configured to determine, in a Tracking Area list assigned to the UE, a first group of Tracking Areas (TAs) adjacent to the first Tracking Area, and transmit the paging request to all eNodeBs belonging to the first group of Tracking Areas, if the UE is not paged.

In an embodiment, a fourth module may be included in the apparatus which is configured to, if the UE is not paged, determine, in the Tracking Area list, a second group of Tracking Areas (TAs) adjacent to the first group of Tracking Areas (TAs) except the one(s) which have been paged, and transmit the paging request to all eNodeBs belonging to the second group of Tracking Areas.

In another embodiment, a fifth module may be included in the apparatus which is configured to, if the UE is not paged, determine, in the Tracking Area list, a next group of Tracking Areas (TAs) which are adjacent to the group of Tracking Areas (TAs) last paged except the ones which have been paged, and transmit the paging request to all eNodeBs belonging to the next group of Tracking Areas.

In a fourth aspect of the invention, there is further provided an apparatus for paging User equipment (UE) smartly in MME pool, comprising: a first module configured to transmit a paging request to a first eNodeB which the UE last accessed; and a second module configured to determine, in an eNodeB list belonging to a Tracking Area (TA) list assigned to the UE, a first group of eNodeBs which are adjacent to the first eNodeB, and transmit the paging request to the first group of eNodeBs, if the UE is not paged.

In an embodiment, a third module may be included in the apparatus which is configured to, if the UE is not paged, determine, in the eNodeB list, a second group of eNodeBs which are adjacent to the first group of eNodeBs except the one(s) which have received the paging request, and transmit the paging request to the second group of eNodeBs.

In another embodiment, a fourth module may be included in the apparatus which is configured to, if the UE is not paged, determine, in the eNodeB list, a next group of eNodeBs which are adjacent to the group of eNodeBs last received the paging request except the ones which have received the paging request, and transmit the paging request to the next group of eNodeBs.

In a fifth aspect of the invention, a Mobile Management Entity (MME) device is provided which includes processing means adapted to implement any one or the combination of the methods in the embodiments of this disclosure.

These aspects provided herein may help to largely decrease the paging load while preventing a perceivable quality degradation for the Radio Access Network (RAN) by determining a most appropriate paging area where the UE may camp using the geography information, and thus significantly increase the paging efficiency and save the radio resources without introducing new message or new Information Element (IE).

BRIEF DESCRIPTION OF THE DRAWINGS

The features and advantages of the present invention will be more apparent from the following exemplary embodiments illustrated with reference to the accompanied drawings, in which.

DETAILED DESCRIPTION

The embodiments will be described thoroughly hereinafter with reference to the accompanied drawings. It will be apparent to those skilled in the art that the disclosure may, however, be implemented in many different forms and should not be construed as being limited to the specific details set forth in the given embodiments. Like numbers refer to like elements throughout the description.

In this disclosure, although specific terminologies have been used to exemplify the embodiments, this should not be seen as limiting the scope of the embodiments to only the aforementioned communication system. With the rapid development in communications, there will of course also be future type of technologies and systems with which the present invention may be adapted.

Figure 1:
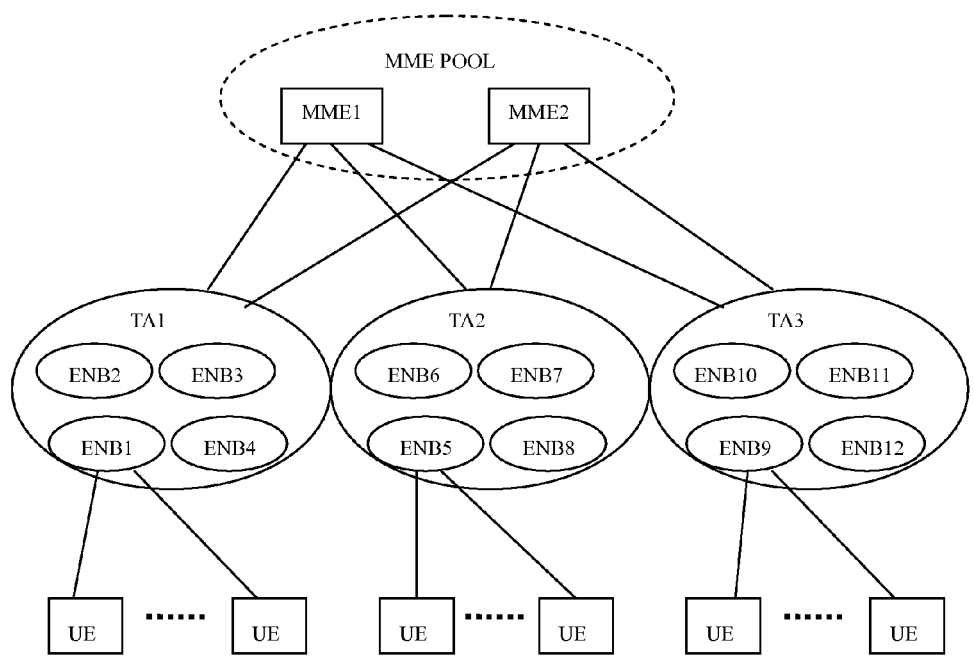
FIG. 1 illustrates an exemplary schematic diagram of a general network scenario.

FIG. 1 illustrates an exemplary schematic diagram of a general network scenario.

In the general exemplary network scenario illustrated in FIG. 1, at least following components are involved: MMEs (e.g., MME1, MME2) in MME pool, eNodeBs (i.e., ENB, e.g. ENBs 1-12) belonging to individual Tracking Areas (e.g., TA1, TA2, TA3), and UEs served by eNodeBs. Depending on the size of the network, the MME and other elements (e.g., eNodeB) may be scalable to meet a multitude of capacities, performance levels and price points. The number of TAs, MMEs, eNodeBs, or UEs shown in FIG. 1 is only provided for an exemplified illustration, not for limitation.

The MME is the key control-node for the LTE access-network. It is responsible for positioning, tracking and paging procedure of UE in idle mode, including retransmission. It is also responsible for many other crucial functions including: a significant part of the bearer activation/deactivation process; user authentication through interaction with the HSS; selection of the SGW and PDN GW; replication of the user traffic for lawful interception applications; and mobility and interaction between the LTE and 2G/3G access networks.

The eNodeB, i.e., Evolved Node B, (also abbreviated as ENB) is the element in E-UTRA of LTE that is the evolution of the element Node B in UTRA of UMTS. It is connected to each MME in MME pool and communicates directly with the UEs.

In LTE, location of UE may be represented by the Tracking Area (TA) which is similar to the Location Area (LA) in the circuit domain except a smaller coverage. One TA may contain one or more cells while one cell can only belong to one TA. With the TA information, the network may know the position of UE in idle mode, and can page the UE when there is data service requirement. A TA list is assigned to the UE and includes a plurality of TAs. The MME may assign the TA list to the corresponding UE and send the TA list to the corresponding UE for saving.

When the network needs to transmit data or signaling to a certain UE, the network pages the UE by determining an appropriate paging area where the UE may camp with most possibility. This may decrease the number of paging messages and consumption of the radio resources. This will be illustrated in detail hereinafter with various embodiments.

Figure 2:
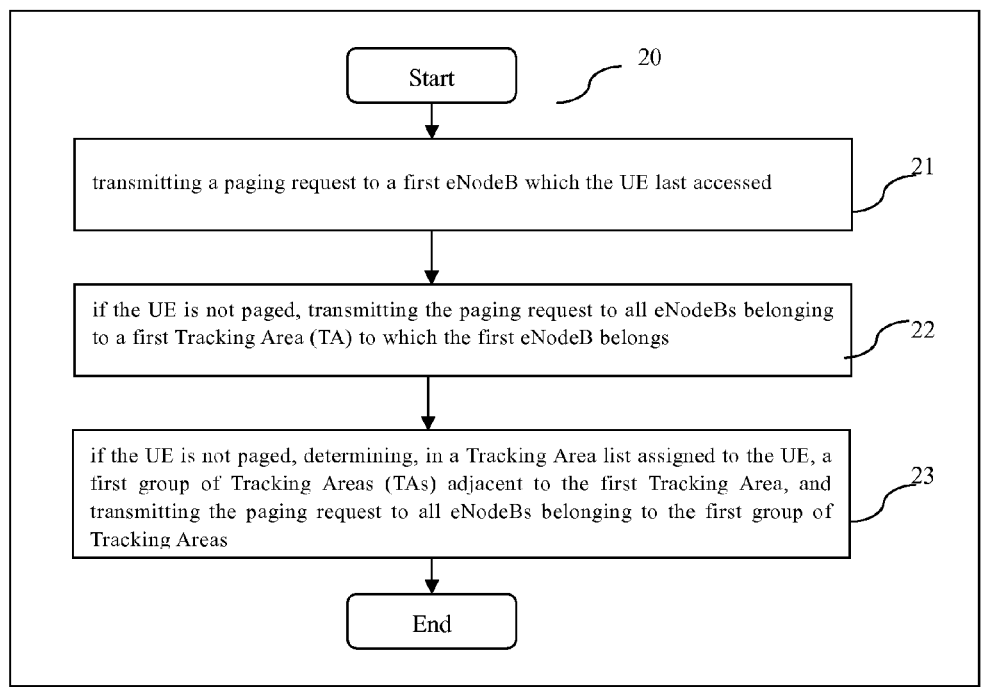
FIG. 2 illustrates an exemplary schematic flowchart of a method for paging UE smartly in MME pool according to an embodiment of the invention.
Figure 3:
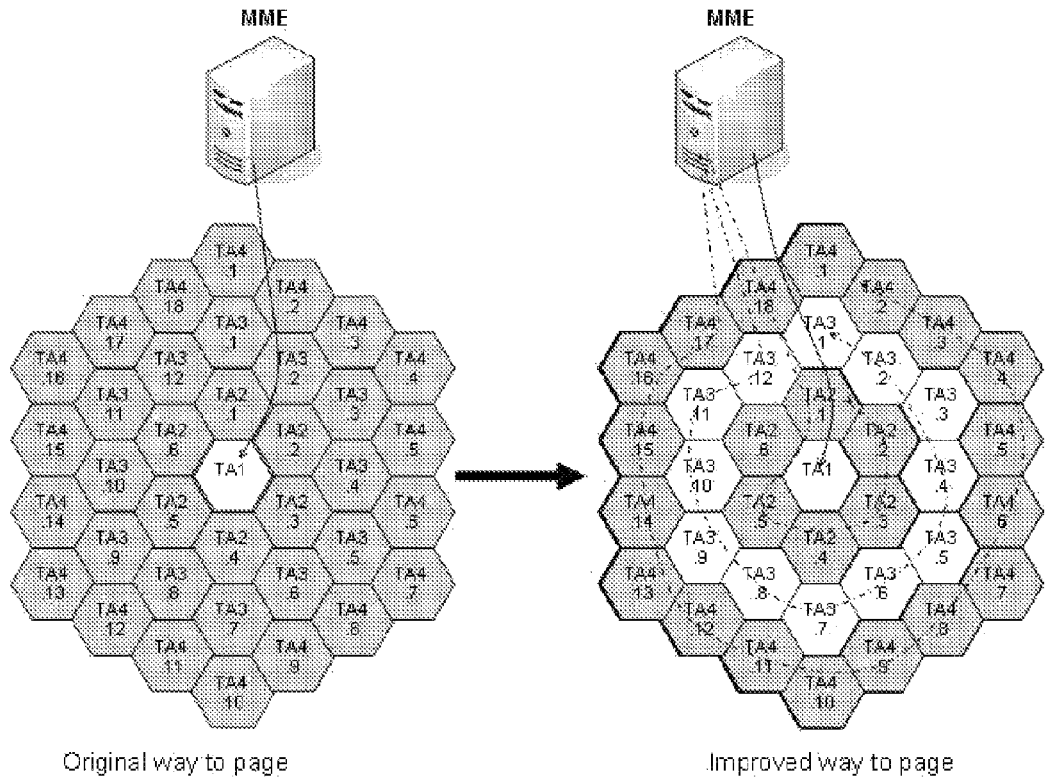
FIG. 3 illustrates an exemplary schematic diagram of smart paging in MME pool in the neighbored Tracking Areas (TA) according to an embodiment of the invention.

FIG. 2 and FIG. 3 illustrate exemplary flowchart and diagram of a method 20 for paging UE smartly in MME pool according to an embodiment of the invention.

First turn to the exemplary network scenario in MME pool shown in FIG. 3. The number of Tracking Areas is only for illustration but not for limitation. As shown, for example, TA1 is the Tracking Area last accessed by the UE. Tracking Area TA1 and Tracking Areas TA3.1-TA3.12 are the exemplary neighboring/adjacent areas to Tracking Areas TA2.1-TA2.6. Tracking Areas TA2.1-TA2.6 and Tracking Areas TA4.1-TA4.18 are the exemplary neighboring areas to Tracking Areas TA3.1-TA3.12. All exemplary Tracking Areas illustrated in FIG. 2 belong to the TA list assigned to the UE to be paged. The operator may configure the Tracking Areas in the TA list assigned to the UE in different groups according to the geographical neighbor relationship.

With reference to FIG. 3, the method 20 for paging User equipment (UE) smartly in MME pool may include the following steps.

In step 21, the MME may transmit a paging request to a first eNodeB which is the eNodeB that the UE last accessed. If the UE is not paged in the first eNodeB, in step 22, the MME may transmit the paging request to all eNodeBs in the first Tracking Area (TA1). The first Tracking Area (TA1) is the Tracking Area the UE last accessed, and the first eNodeB belongs to this first Tracking Area. If the UE is still not paged in TA1, in step 23, the MME may determine, in the Tracking Area list assigned to the UE, a first group of Tracking Areas (i.e., TA2.1-TA2.6) adjacent to the first Tracking Area (TA1), and transmit the paging request to all eNodeBs belonging to the first group of Tracking Areas (TA2.1-TA2.6).

Alternatively, the first group of TAs may include not only Tracking Areas TA2.1-TA2.6, but also the first Tracking Area (TA1).

This may largely decrease the paging load and save the radio resources with a negligible effect to the service quality.

In an embodiment, the method 20 may further include, if the UE is not paged in the first group of TAs, the MME may determine, in the Tracking Area list assigned to the UE, a second group of Tracking Areas (TAs), and transmit the paging request to all eNodeBs belonging to the second group of Tracking Areas. The second group of Tracking Areas include the TAs which are adjacent to the first group of Tracking Areas except the ones (i.e., TAs) that have been paged before. Particularly, in the embodiment, the second group of TAs include the adjacent Tracking Areas TA3.1-TA3.12 but not include the adjacent Tracking Area TA1.

Alternatively, the second group of Tracking Areas may include not only the Tracking Areas TA3.1-TA3.12, but also the group of Tracking Areas TA2.1-TA2.6.

Alternatively, the second group of Tracking Areas may include not only the Tracking Areas TA3.1-TA3.12, but also the group of Tracking Areas TA2.1-TA2.6 and the first Tracking Area TA1 that have been paged before.

This may largely decrease the paging load and save the radio resources with a negligible effect to the service quality.

In an embodiment, if the UE is still not paged in the second group of Tracking Areas, the MME may determine, in the Tracking Area list assigned to the UE, a third group of Tracking Areas which are adjacent to the second group of Tracking Areas but have not been paged before, and transmit the paging request to all eNodeBs belonging to the third group of Tracking Areas. Particularly, in the embodiment, the third group of Tracking Areas include the adjacent Tracking Areas TA4.1-TA4.18, but not include the adjacent group of Tracking Areas TA2.1-TA2.6 that have been paged before.

Alternatively, the third group of Tracking Areas may include the adjacent Tracking Areas TA4.1-TA4.18 and the group of Tracking Areas (TAs) last paged, TA3.1-TA3.12.

Alternatively, the third group of Tracking Areas (TAs) may include the adjacent Tracking Areas TA4.1-TA4.18 and all Tracking Areas (TAs) which have been paged before, including TA3.1-TA3.12, TA2.1-TA2.6, and TA1.

This may largely decrease the paging load and save the radio resources with a negligible effect to the service quality.

In an embodiment, if the UE is not paged, the MME may determine, in the Tracking Area list assigned to the UE, a next group of Tracking Areas (TAs) which are adjacent to the group of Tracking Areas last paged except the TAs which have been paged before, and transmit the paging request to all eNodeBs belonging to the next group of Tracking Areas.

Alternatively, the next group of Tracking Areas (TAs) may include the group of Tracking Areas (TAs) last paged, and the group of Tracking Areas (TAs) which are adjacent to the group of Tracking Areas (TAs) last paged except the ones which have been paged before.

Alternatively, the next group of Tracking Areas may include all Tracking Areas which have been paged before, and the group of Tracking Areas which are adjacent to the group of Tracking Areas last paged except the ones which have been paged before.

These embodiments may efficiently decrease the paging load and save radio resources while preventing perceivable service quality degradation. Also, it provides a flexible selection for the operator to determine and configure the paging area based on service requirements and real network conditions.

Figure 4:
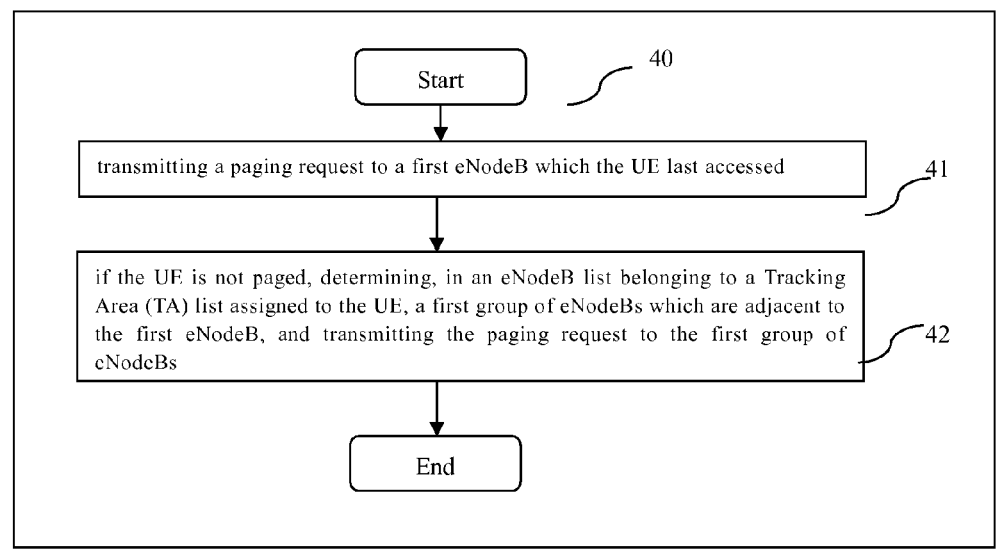
FIG. 4 illustrates an exemplary schematic flowchart of a method for paging UE smartly in MME pool according to an embodiment of the invention.
Figure 5:
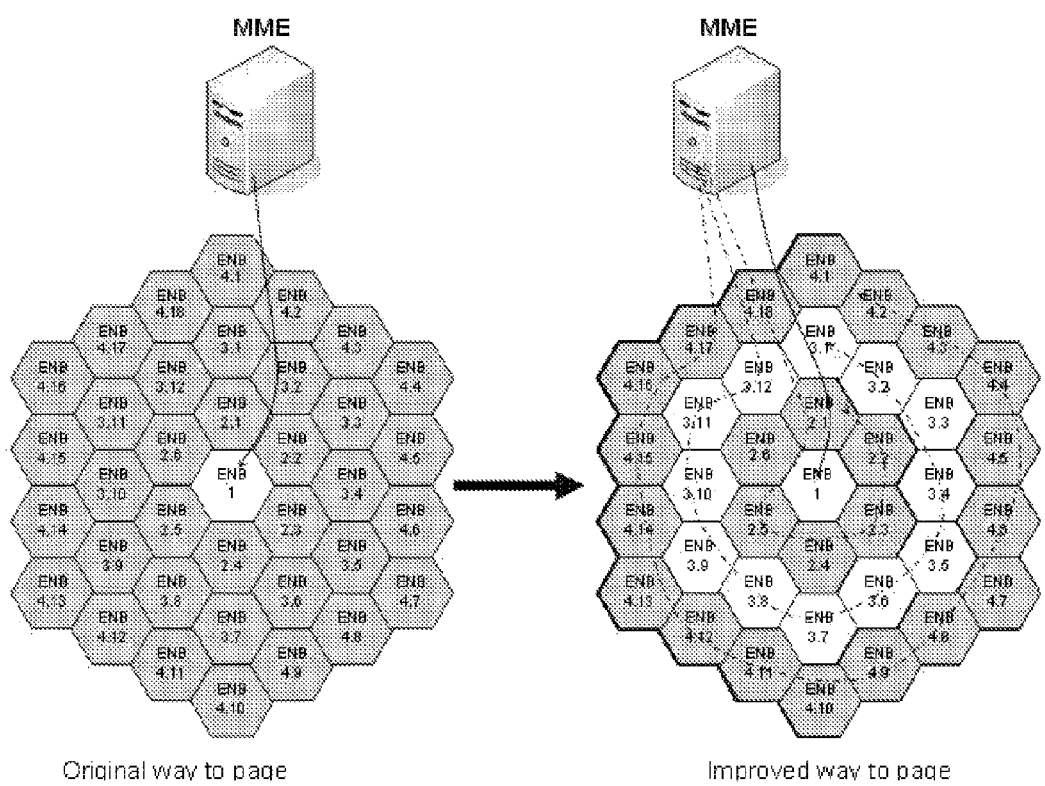
FIG. 5 illustrates an exemplary schematic diagram of smart paging in MME pool in the neighbored eNodeBs according to an embodiment of the invention.

FIGS. 4 and 5 illustrate an exemplary schematic flowchart and diagram of smart paging in MME pool in the neighbored eNodeBs according to another embodiment of the invention.

It is to be noted that this is an example in MME pool. eNodeB 1 is the eNodeB last accessed by the UE. An eNodeB list includes all the eNodeBs belonging to the TA list assigned to the UE. The operator may configure the eNodeBs in the eNodeB list in different groups according to geographical neighbor relationship. The number of eNodeBs is only used for illustration but not for limitation.

Similarly, for example, as shown in FIG. 5, eNodeBs ENB1 and ENB3.1-ENB3.12 are the exemplary neighboring/adjacent areas to eNodeBs ENB2.1-ENB2.6. eNodeBs ENB2.1-ENB2.6 and eNodeBs ENB4.1-ENB4.18 are the exemplary neighboring areas to the eNodeBs ENB3.1-ENB3.12. eNodeBs ENB4.1-ENB4.18 are the exemplary neighboring areas for eNodeBs ENB3.1-ENB3.12. All exemplary eNodeBs illustrated in FIG. 5 belong to the eNodeBs list for the UE.

With reference to FIG. 5, the method 40 for paging User equipment (UE) smartly in MME pool may include the following steps.

In step 41, the MME transmits a paging request to a first eNodeB which is the eNodeB that the UE last accessed. If the UE is not paged, in step 42, the MME determines, in the eNodeB list, a first group of eNodeBs which are adjacent to the first eNodeB, and transmits the paging request to the first group of eNodeBs. It is to be noted that the eNodeB list includes all the eNodeBs (including the first eNodeB ENB1) which belong to the Tracking Area (TA) list assigned to the UE. The first group of eNodeBs may include the adjacent eNodeBs ENB2.1-ENB2.6.

Alternatively, the first group of eNodeBs may include not only the adjacent eNodeBs ENB2.1-ENB2.6, but also the first eNodeB ENB1.

This may largely decrease the paging load and save the radio resources with a negligible effect to the service quality.

In an embodiment, the method 40 may further include, if the UE is not paged, the MME may determines, in the eNodeB list, a second group of eNodeBs which are adjacent to the first group of eNodeBs except the ones which have received the paging request before, and transmit the paging request to the second group of eNodeBs. The second group of eNodeBs may include the adjacent eNodeBs ENB3.1-ENB3.12, but not include the adjacent eNodeB ENB1.

Alternatively, the second group of eNodeBs may include the adjacent eNodeBs ENB3.1-ENB3.12 and also the group of eNodeBs ENB2.1-ENB2.6 that last received the paging request.

Alternatively, the second group of eNodeBs may include the adjacent eNodeBs ENB3.1-ENB3.12, and also all the eNodeBs which have received the paging request before, including the eNodeBs ENB2.1-ENB2.6 and the first eNodeB ENB1.

This may also largely decrease the paging load and save the radio resources with a negligible effect to the service quality.

In an embodiment, the method 40 may further include, if the UE is not paged, the MME may determines, in the eNodeB list, a third group of eNodeBs which are adjacent to the second group of eNodeBs except the ones which have received the paging request before, and transmit the paging request to the third group of eNodeBs. The third group of eNodeBs may include the adjacent group of eNodeBs ENB4.1-ENB4.18, but not include the adjacent group of eNodeBs ENB2.1-ENB2.6.

Alternatively, the third group of eNodeBs may include not only the adjacent group of eNodeBs ENB4.1-ENB4.18, but also the group of eNodeBs ENB3.1-ENB3.12 which last received the paging request.

Alternatively, the third group of eNodeBs may include not only the adjacent group of eNodeBs ENB4.1-ENB4.18, but also all the eNodeBs which have received the paging request before, including the eNodeBs ENB3.1-ENB3.12, ENB2.1-ENB2.6 and the first eNodeB ENB1.

This may also largely decrease the paging load and save the radio resources with a negligible effect to the service quality.

In an embodiment, the method 40 may further include, if the UE is not paged, the MME may determine, in the eNodeB list, a next group of eNodeBs, and transmit the paging request to the next group of eNodeBs. In the embodiment, the next group of eNodeBs may include eNodeBs which are adjacent to the group of eNodeBs last received the paging request, except the ones which have received the paging request before.

Alternatively, the next group of eNodeBs may include not only eNodeBs which are adjacent to the group of eNodeBs last received the paging request except the ones which have received the paging request before, but also the group of eNodeBs last received the paging request.

Alternatively, the next group of eNodeBs includes eNodeBs which are adjacent to the group of eNodeBs last received the paging request except the ones which have received the paging request before, but also all the eNodeBs which have received the paging request before.

These embodiments may efficiently decrease the paging load and save radio resources while preventing perceivable service quality degradation. Also, it provides a flexible selection for the operator to determine and configure the paging area based on service requirements and real network conditions.

Figure 6:
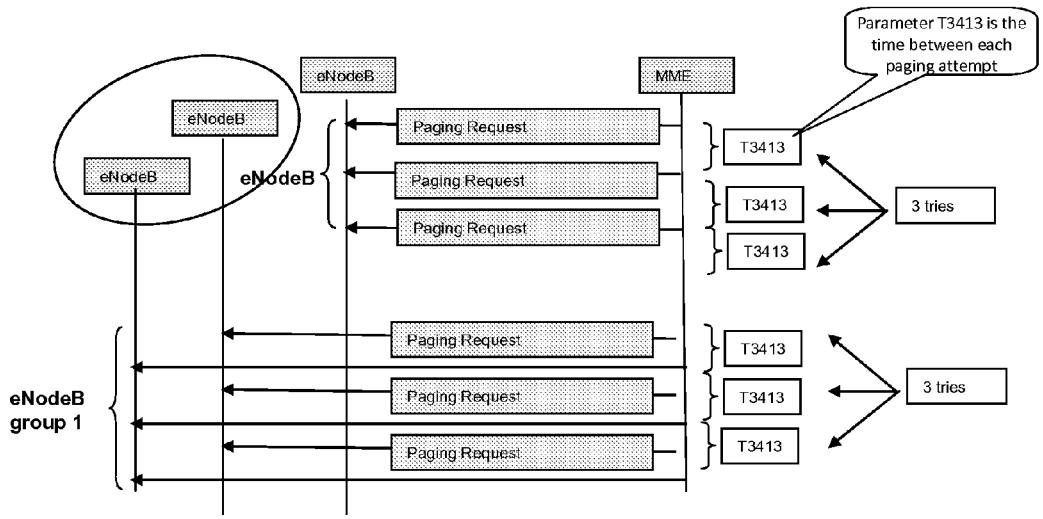
FIGS. 6 and 7 illustrate an exemplary schematic diagram of signaling flowcharts for paging UE in the neighbored eNodeBs according to an embodiment of the invention.
Figure 7:
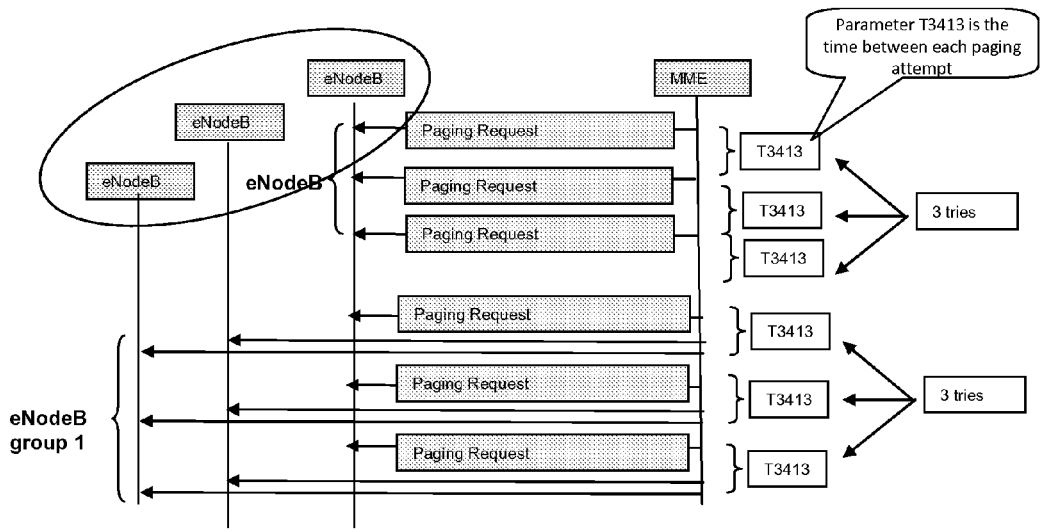

FIGS. 6 and 7 illustrate an exemplary schematic diagram of signaling flowcharts for paging UE in the neighbored eNodeBs according to an embodiment of the invention.

For example, the MME may firstly page the UE in the last accessed eNodeB (e.g., ENB1). If there is no response received, the MME may page the UE in the neighbored group of eNodeBs (e.g., the first group of eNodeBs). The eNodeBs may be grouped as described above. As an example, FIG. 6 shows the first group of eNodeBs may include the group of eNodeBs (e.g., within the circle) adjacent to the eNodeB last accessed by the UE, but not include the eNodeB last accessed (ENB1). In FIG. 7, the first group of eNodeBs include the eNodeB last accessed (ENB1) and also the group of eNodeBs adjacent to ENB1. If there is no response further, the MME may page the UE in the next eNodeB group to expand the paging area if it's configured.

As shown in FIGS. 6 and 7, parameter T3413 is the time interval between each paging attempt which may be configured by the operator depending on the network conditions or service quality requirements, etc. Each eNodeB may be configured to be paged for several times, e.g., three times as shown. For example, within the group of eNodeBs, the eNodeBs may be configured to be paged in turn.

Figure 8:
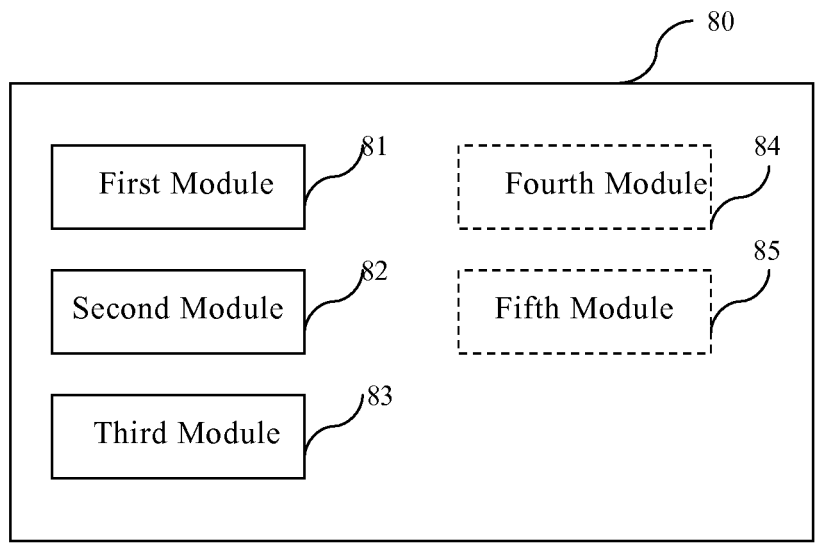
FIG. 8 illustrates an exemplary schematic block diagram of an apparatus for paging UE smartly in MME pool according to an embodiment of the invention.

FIG. 8 illustrates an exemplary schematic block diagram of an apparatus 80 for paging UE smartly in MME pool according to an embodiment of the invention.

The apparatus 80 may include a first module 81, second module 82, and a third module 83. The first module 81 may be configured to transmit a paging request to a first eNodeB which the UE last accessed. The second module 82 may be configured to, if the UE is not paged, transmit the paging request to all eNodeBs belonging to a first Tracking Area (TA1) to which the first eNodeB belongs. The third module 83 may be configured to, if the UE is not paged, determine, in a Tracking Area list assigned to the UE, a first group of Tracking Areas (TA2.1-TA2.6) adjacent to the first Tracking Area (TA1), and transmit the paging request to all eNodeBs belonging to the first group of Tracking Areas (TA2.1-TA2.6).

In an embodiment, the apparatus 80 may further include a fourth module 84. The fourth module 84 may be configured to, if the UE is not paged, determine, in the Tracking Area list, a second group of Tracking Areas (TAs) which are adjacent to the first group of Tracking Areas (TAs) except the ones which have been paged before, and transmit the paging request to all eNodeBs belonging to the second group of Tracking Areas.

In an embodiment, the apparatus 80 may further include a fifth module 85. The fifth module 85 may be configured to, if the UE is not paged, determine, in the Tracking Area list, a next group of Tracking Areas (TAs) which are adjacent to the group of Tracking Areas (TAs) last paged except the ones which have been paged before, and transmit the paging request to all eNodeBs belonging to the next group of Tracking Areas.

It is to be noted that the paging area may be determined in the TA list as described in other embodiments hereinabove, and will not be reiterated here.

It is also to be noted that functionality illustrated to be performed by separate modules, processors may be performed by the same module or processor. Hence, references to specific functional units/modules are only to be seen as references to suitable means for providing the described functionality rather than indicative of a strict logical or physical structure or organization.

Figure 9:
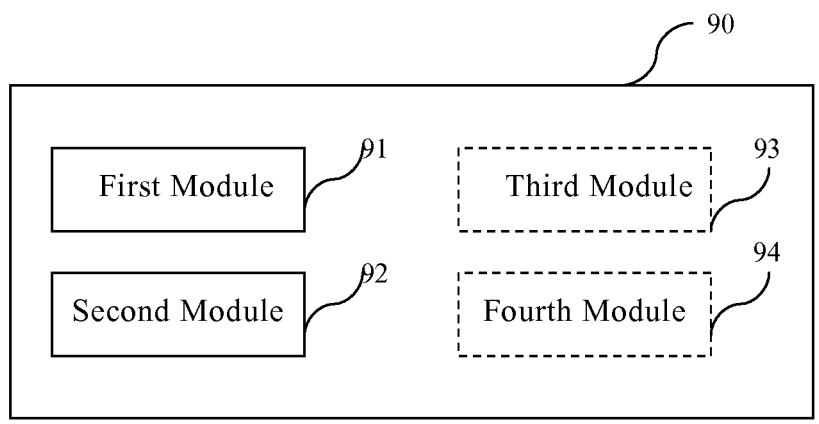
FIG. 9 illustrates an exemplary schematic block diagram of an apparatus for paging UE smartly in MME pool according to an embodiment of the invention.

FIG. 9 illustrates an exemplary schematic block diagram of an apparatus 90 for paging UE smartly in MME pool according to an embodiment of the invention.

The apparatus 90 may include a first module 91 and a second module 92. The first module 91 may be configured to transmit a paging request to a first eNodeB (ENB1) which the UE last accessed. The second module 92 may be configured to, if the UE is not paged, determine, in an eNodeB list, a first group of eNodeBs (e.g., ENB2.1-ENB2.6) which are adjacent to the first eNodeB (ENB1), and transmit the paging request to the first group of eNodeBs (e.g., ENB2.1-ENB2.6). The eNodeB list includes all the eNodeBs (including the first eNodeB) which belong to the Tracking Area (TA) list assigned to the UE.

In an embodiment, the apparatus 90 may further include a third module 93. The third module 93 may be configured to, if the UE is not paged, determine, in the eNodeB list, a second group of eNodeBs, and transmit the paging request to the second group of eNodeBs. The second group of eNodeBs (such as ENB3.1-ENB3.12) are adjacent to the first group of eNodeBs but have not received the paging request before.

In an embodiment, the apparatus 90 may further include a fourth module 94. The fourth module 94 may be configured to, if the UE is not paged, determine, in the eNodeB list, a next group of eNodeBs, and transmit the paging request to the next group of eNodeBs. The next group of eNodeBs include the eNodeBs which have not received the paging request before and are adjacent to the group of eNodeBs last received the paging request.

It is to be noted that the paging area may be determined in the eNodeB list as described in other embodiments hereinabove, and will not be reiterated here. The elements and components of an embodiment of the invention may be physically, functionally and logically implemented in any suitable way. The embodiment(s) may be implemented in a single unit or may be physically and functionally distributed between different units and processors.

The apparatuses 80 and 90 may be implemented as a Mobile Management Entity (MME) device, which may include processing means adapted to execute any method according to the various embodiments of the invention.

Alternatively or additively, a computer program product including a set of computer executable instructions stored on a computer readable medium, may be configured to implement any of the methods according to the various embodiments of the invention.

Alternatively or additively, a computer-readable medium having stored thereon a computer program product may include a set of computer executable instructions which when executed by a processor in a computing device, causes the computing device to implement any of the methods according to the various embodiments of the invention.

The embodiments can be implemented in any suitable form including hardware, software, firmware or any combination of these. The embodiments may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the embodiments may be implemented in a single unit or may be physically and functionally distributed between different units and processors.

Although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. Reference signs in the claims are provided merely as a clarifying example shall not be construed as limiting the scope of the claims in any way.

The terminology used herein is for the purpose of describing particular embodiments only and is not intended to limit to the invention. As used herein, the singular forms "a", "an" and "the" are intended to include the plural forms as well, unless otherwise stated. It will be further understood that the terms "including", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. A method for paging User equipment (UE) smartly in MME pool, comprising:
   transmitting a paging request to a first eNodeB which the UE last accessed;
   if no response is received in response to transmitting the paging request to the first eNodeB which the UE last accessed, transmitting the paging request to all eNodeBs belonging to a first Tracking Area to which the first eNodeB belongs;
   if no response is received in response to transmitting the paging request to all eNodeBs belonging to the first Tracking Area to which the first eNodeB belongs, determining, in a Tracking Area list assigned to the UE, a first group of Tracking Areas adjacent to the first Tracking Area, and transmitting the paging request to all eNodeBs belonging to the first group of Tracking Areas; and if no response is received in response to transmitting the paging request to all eNodeBs belonging to the first group of Tracking Areas, determining, in the Tracking Area list, a second group of Tracking Areas which are adjacent to the first group of Tracking Areas except the ones which have been paged, and transmitting the paging request to all eNodeBs belonging to the second group of Tracking Areas.

2. The method according to claim 1, wherein the first group of Tracking Areas (TAs) further include the first Tracking Area.

3. The method according to claim 1, wherein the second group of Tracking Areas (TAs) further include the first group of Tracking Areas.

4. The method according to claim 1, wherein the second group of Tracking Areas (TAs) further include the first group of Tracking Areas and the first Tracking Area.

5. The method according to claim 1, comprising:
if no response is received in response to transmitting the paging request to all eNodeBs belonging to the second group of Tracking Areas, determining, in the Tracking Area list, a next group of Tracking Areas (TAs) which are adjacent to the group of Tracking Areas (TAs) last paged except the ones which have been paged, and transmitting the paging request to all eNodeBs belonging to the next group of Tracking Areas.

6. The method according to claim 5, wherein the next group of Tracking Areas further include the group of Tracking Areas last paged.

7. The method according to claim 5, wherein the next group of Tracking Areas further include all the Tracking Areas which have been paged.

8. A method for paging User equipment (UE) smartly in MME pool, comprising:
transmitting a paging request to a first eNodeB which the UE last accessed;
if no response is received in response to transmitting the paging request to the first eNodeB which the UE last accessed, determining, in an eNodeB list belonging to a Tracking Area (TA) list assigned to the UE, a first group of eNodeBs which are all adjacent to the first eNodeB, and transmitting the paging request to the first group of eNodeBs; and
if no response is received in response to transmitting the paging request to all eNodeBs belonging to the first group of Tracking Areas, determining, in the Tracking Area list, a second group of Tracking Areas which are adjacent to the first group of Tracking Areas except the ones which have been paged, and transmitting the paging request to all eNodeBs belonging to the second group of Tracking Areas.

9. The method according to claim 8, wherein the first group of eNodeBs further includes the first eNodeB.

10. The method according to claim 8, comprising:
if no response is received in response to transmitting the paging request to the first group of eNodeBs, determining, in the eNodeB list, a second group of eNodeBs which are adjacent to the first group of eNodeBs except the ones which have received the paging request, and transmitting the paging request to the second group of eNodeBs.

11. The method according to claim 10, wherein the second group of eNodeBs further include the first group of eNodeBs.

12. The method according to claim 10, wherein the second group of eNodeBs further include the first group of eNodeBs and the first eNodeB.

13. The method according to claim 10, comprising:
if no response is received in response to transmitting the paging request to the second group of eNodeBs, determining, in the eNodeB list, a next group of eNodeBs which are adjacent to the group of eNodeBs last received the paging request except the ones which have received the paging request, and transmitting the paging request to the next group of eNodeBs.

14. The method according to claim 13, wherein the next group of eNodeBs further includes the group of eNodeBs that last received the paging request.

15. The method according to claim 13, wherein the next group of eNodeBs further includes all the eNodeBs which have received the paging request.

16. An apparatus for paging User equipment (UE) smartly in MME pool, comprising:
a first module configured to transmit a paging request to a first eNodeB the UE last accessed;
a second module configured to transmit the paging request to all eNodeBs belonging to a first Tracking Area (TA) to which the first eNodeB belongs, if no response is received to the paging request to the first eNodeB the UE last accessed;
a third module configured to determine, in a Tracking Area list assigned to the UE, a first group of Tracking Areas (TAs) adjacent to the first Tracking Area, and transmit the paging request to all eNodeBs belonging to the first group of Tracking Areas, if no response is received to the paging request to all eNodeBs belonging to the first Tracking Area to which the first eNodeB belongs; and
a fourth module configured to, if no response is received to the paging request to all eNodeBs belonging to the first group of Tracking Areas, determine, in the Tracking Area list, a second group of Tracking Areas which are adjacent to the first group of Tracking Areas except the ones which have been paged, and transmit the paging request to all eNodeBs belonging to the second group of Tracking Areas.

17. The apparatus according to claim 16, comprising:
a fifth module configured to, if no response is received to the paging request to all eNodeBs belonging to the second group of Tracking Areas, determine, in the Tracking Area list, a next group of Tracking Areas which are adjacent to the group of Tracking Areas last paged except the ones which have been paged, and transmit the paging request to all eNodeBs belonging to the next group of Tracking Areas.

18. An apparatus for paging User equipment (UE) smartly in MME pool, comprising:
a first module configured to transmit a paging request to a first eNodeB the UE last accessed;
a second module configured to determine, in an eNodeB list belonging to a Tracking Area (TA) list assigned to the UE, a first group of eNodeBs which are all adjacent to the first eNodeB, and transmit the paging request to the first group of eNodeBs, if no response is received to the paging request to the first eNodeB the UE last accessed; and
a third module configured to, if no response is received to the paging request to all eNodeBs belonging to the first group of Tracking Areas, determine, in the Tracking Area list, a second group of Tracking Areas which are adjacent to the first group of Tracking Areas except the ones which have been paged, and transmit the paging request to all eNodeBs belonging to the second group of Tracking Areas.

19. The apparatus according to claim 18, comprising:
a fourth module configured to, if no response is received to transmitting the paging request to the first group of eNodeBs, determine, in the eNodeB list, a second group of eNodeBs which are adjacent to the first group of eNodeBs except the ones which have received the paging request, and transmit the paging request to the second group of eNodeBs.

20. The apparatus according to claim 18, comprising:
a fourth module configured to, if no response is received in response to transmitting the paging request to the second group of eNodeBs, determine, in the eNodeB list, a next group of eNodeBs which are adjacent to the group of eNodeBs last received the paging request except the ones which have received the paging request, and transmit the paging request to the next group of eNodeBs.

* * * * *